United States Patent [19]
York

[11] Patent Number: 5,850,340
[45] Date of Patent: Dec. 15, 1998

[54] INTEGRATED REMOTE CONTROLLED COMPUTER AND TELEVISION SYSTEM

[76] Inventor: Matthew York, c/o Idears Inc., P.O. Box 5350, Chico, Calif. 95927

[21] Appl. No.: 628,464

[22] Filed: Apr. 5, 1996

[51] Int. Cl.⁶ .................................................. G05B 9/02
[52] U.S. Cl. .......................... 364/188; 364/138; 364/132; 395/183.26; 395/183.19; 395/200
[58] Field of Search ..................................... 364/188, 138, 364/132; 395/200, 183.06, 183.19; 348/512, 552, 565; 386/83

[56] References Cited

U.S. PATENT DOCUMENTS

| | | |
|---|---|---|
| 4,026,555 | 5/1977 | Kirschner et al. . |
| 4,337,480 | 6/1982 | Bourassin et al. . |
| 4,577,229 | 3/1986 | De La Cierva, Sr. et al. ......... 348/512 |
| 4,739,406 | 4/1988 | Morton et al. . |
| 4,875,096 | 10/1989 | Baer et al. .............................. 358/485 |
| 4,894,789 | 1/1990 | Yee ........................................ 348/552 |
| 4,897,726 | 1/1990 | Morton et al. . |
| 4,920,503 | 4/1990 | Cook ..................................... 348/552 |
| 5,016,106 | 5/1991 | Yong-Je et al. ........................ 348/565 |
| 5,027,212 | 6/1991 | Marlton et al. ........................ 348/512 |
| 5,047,867 | 9/1991 | Strubbe et al. ........................ 386/83 |
| 5,111,296 | 5/1992 | Duffield et al. . |
| 5,218,432 | 6/1993 | Wakeland ................................ 358/22 |
| 5,251,301 | 10/1993 | Cook . |
| 5,254,984 | 10/1993 | Wakeland ............................... 345/114 |
| 5,283,819 | 2/1994 | Glick et al. . |
| 5,396,546 | 3/1995 | Remillard . |
| 5,404,393 | 4/1995 | Remillard . |
| 5,461,667 | 10/1995 | Remillard . |
| 5,722,041 | 2/1998 | Freadman ............................... 455/6.3 |

OTHER PUBLICATIONS

Welland Industrial Co., Ltd, Parallel & Bi–Tronics & Serial Auto Data Switch (Product Publ.—4 pgs.).

Gateway 2000, Gateway 2000 Destination, 1996 Gateway 2000, Inc. (Product Publ.—2 pgs.).

Aten International Co., Ltd., 2/4/6 Ports CPU Switch, (Product Publ.—2 pgs.).

Thomson Consumer Electronics, Series of Entertainment, Educational Products to Emerge From New RCA Brand Internet Access Device, Official Says, (Product Publ.—2 pgs.).

Boot Reviews, NetTV World Vision: An advance look, Boot Preview Issue pp. 24 & 25 (Product Publ.—2 pgs.).

VideoTest, Net Gain, Ken C. Pohlmann & Michael Antonoff, pp. 66–68 & 70, (Product Publ.—4 pgs.).

Sony, INT–W100 Internet Terminal, (Product Publ.—4 pgs.).

Quality Value Service, Computer Accessories Product Catalog, p. 20 (Product Publ.—1 pg.).

GWC Technology Inc., Keyboard Extender & PC Sharing Box Kit, pp. 38–39 (Product Publ.—2 pgs.).

A World Of Opportunities, *Mitsubishi The Big Screen*, p. 5 (Product Publication—1 pg.).

Hill et al., "When a TV Joins a PC, Will Anybody Be Watching?", *Wall Street Journal*, Apr. 3, 1996, 3 pages.

*Primary Examiner*—Reba I. Elmore
*Assistant Examiner*—McDieunel Marc

[57] ABSTRACT

A system which includes a remote keyboard and a remote pointer to control a personal computer (PC). The PC generates a PC monitor display and sounds, and a device projects that same display image and plays the same sounds on a remotely located television. A remote keyboard and remote pointer may be in one room with the television, while the PC is in another room. Another system permits the PC to not merely generate and project its PC monitor display on the TV but, also, to control the TV's functions, including program selection, viewing, recording, and scheduling.

17 Claims, 6 Drawing Sheets

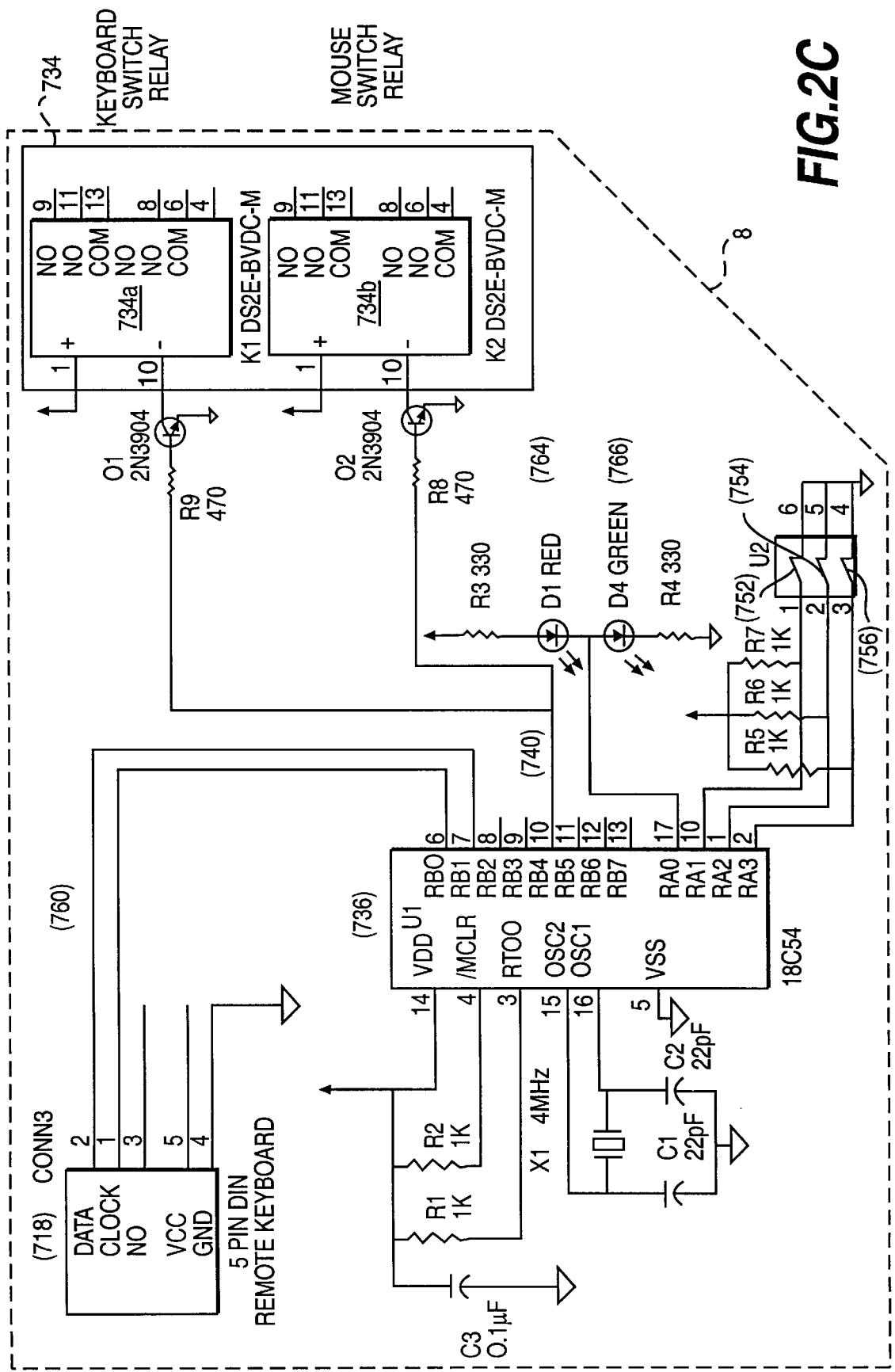

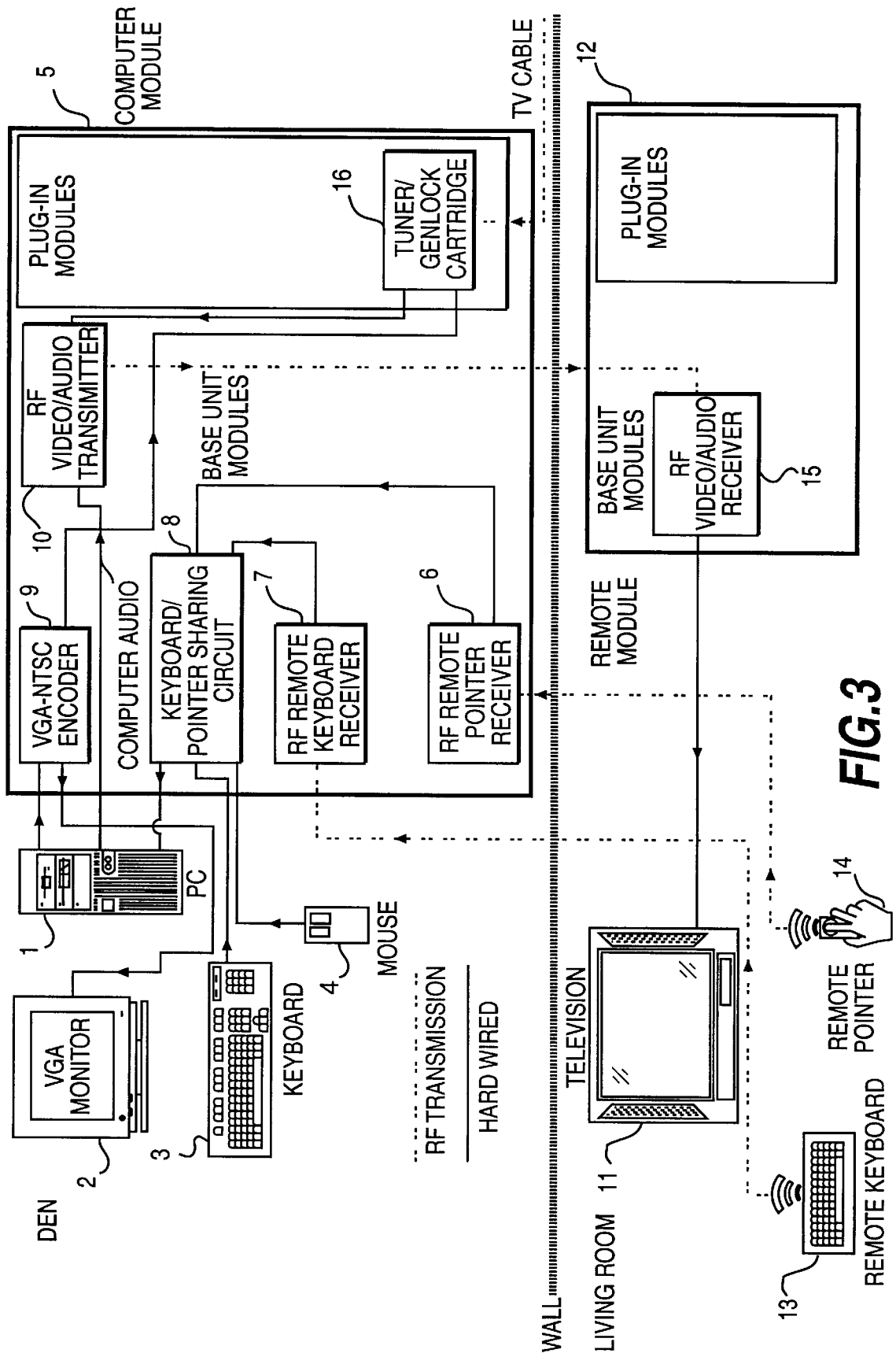

INTEGRATED REMOTE CONTROLLED COMPUTER AND TELEVISION SYSTEM

BACKGROUND OF THE INVENTION

The field of this invention includes computer displays, television displays, input/output methods for computers, and remote control devices for computers and televisions.

Some prior art exists that permits the projection of computer displays on televisions; however, the prior art does not conveniently and completely integrate computers and televisions in a system that is conveniently remote controlled.

Some remote wireless controls for televisions and personal computers ("PCs") are available; however, complete and convenient remote wireless control of integrated television and computers are not available in the prior art.

SUMMARY OF THE INVENTION

It is an object of the present invention to fully integrate televisions and computers, such as PCs, and to control the integrated system remotely and in a wireless manner to allow for convenient usage. Particularly, it is an object of the present invention to permit the user, while reclining across the room from the television and/or out of the room containing the PC, to control both the television and the PC with components of the system.

It is also an object of the present invention to integrate televisions and PCs in a manner such that the computer can completely and fully control the television, a VCR, a cable set-top box, and any other home entertainment device.

The present invention includes the Couch Link embodiment. Couch Link provides for a remote keyboard, a remote joystick, and a remote pointer to control a PC. The PC generates a PC monitor display and the invention projects the same display image on a television.

The Relink embodiment of the present invention further permits the PC to not merely generate and project its PC monitor display on the TV, but also to control the TV's functions, including program selection, viewing, recording, and scheduling. This is done by the invention sending commands to the TV, the VCR, the cable set-top box and/or any other home entertainment device.

The present invention is a new type of local area network architecture transmitting a different order of data over the network than is the case in conventional networks, and as a result the present invention also uses a different distribution of hardware on the network. The present invention transmits on its network ASCI keystroke commands, and cursor location control commands, and visual displays. As a result, the present invention does not require CPU and RAM capacity at each node in the network. On the other hand, conventional networks transmit a different order of information, including bit packets between CPUs, and hence require CPU and RAM capacity at each node.

BRIEF DESCRIPTION OF THE DRAWINGS

FIGS. 2A, 2B, and 2C are schematic drawings of the sharing circuit of the present invention.

FIG. 3 is a schematic drawing of the components of a tuner cartridge Relink embodiment of the present invention, which includes an add-on cartridge or module.

DESCRIPTION OF THE PREFERRED EMBODIMENTS

The Couch Link Embodiment

Figure 1:
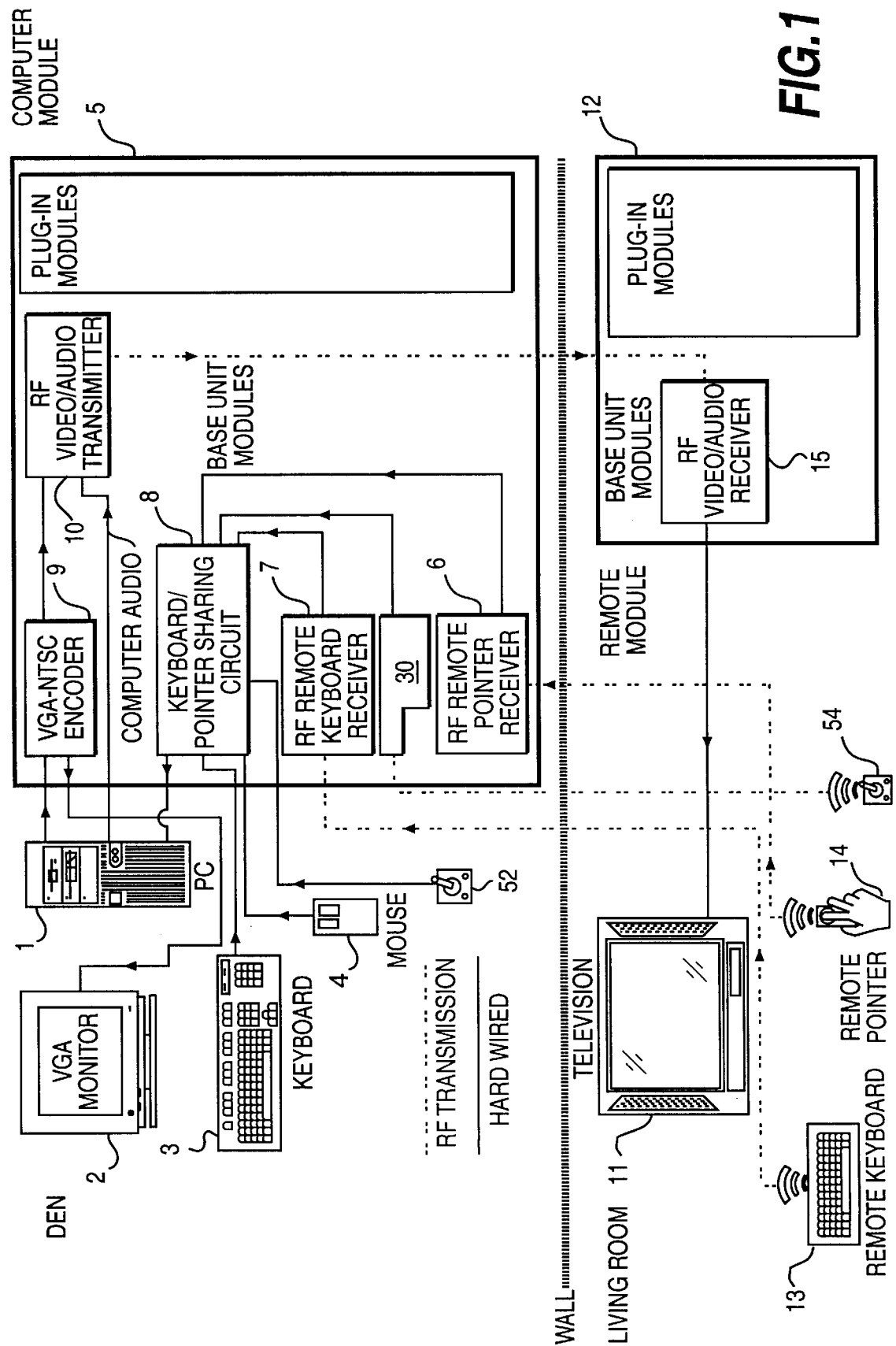
FIG. 1 is a schematic drawing of the configuration of the components of a base unit Couch Link embodiment of the present invention.

FIG. 1 shows a schematic representation of the components of the basic Couch Link embodiment of the present invention.

The Couch Link includes a PC 1, a VGA monitor 2, a wired keyboard 3, and a wired mouse 4. All four of these components electronically communicate by wire to a computer module 5. The computer module 5 includes a radio frequency ("RF") remote pointer receiver 6, an RF remote keyboard receiver 7, an optional RF remote joystick receiver 30, a keyboard, pointer, joystick switch device or sharing circuit 8 (shown in the figures as the keyboard/pointer sharing circuit 8), a power circuit (not shown), a VGA-NTSC encoder 9, and an RF video and audio transmitter 10.

The computer module 5 may be sold as a separate product which is plug compatible with the PC 1, monitor 2, keyboard 3, and mouse 4. An optional joystick 52 may also be included with the computer module 5 which is plug compatible with the PC 1. Any compatible joystick may be used for joystick 52.

The Couch Link system further uses a television ("TV") 11, a remote module 12, a remote wireless keyboard 13, and a remote wireless pointer 14. An optional remote joystick 54 may also be included with the remote module 12, however in the preferred embodiment, wireless joysticks are not currently recommended. The remote module 12 includes an RF video and audio receiver 15. The remote module 12 may be sold as a separate product that is plug compatible to the input terminals or plugs of the TV 11.

The TV 11, remote module 12, wireless remote keyboard 13, and wireless remote pointer 14 may be in a room together. This room may be the living room and separate from another room, perhaps a den, in which is contained the PC 1, its monitor 2, keyboard 3, mouse 4, and computer module 5.

The present invention may use an integrated keyboard with a trackball, or a separate trackball device. Any cursor control device may be used, either integrated with a keyboard or as a separate device. For example, a touch pad can be used, either integrated with a keyboard or as a separate device. Any such device to control or create symbols or images on a display may be used with the present invention, including wired devices and wireless versions of the same devices. In the preferred embodiment, no wireless touch pad is currently recommended.

It is currently anticipated that the current invention will be sold as a package including the computer module 5, the remote module 12, the wireless keyboard 13 and the wireless remote pointer 14. These can then be used by the consumer together with the TV 11, the PC 1, a VCR, and other components discussed herein.

The PC 1 communicates by wire to the VGA-NTSC encoder 9, the keyboard, pointer, joystick switch device 8 and the RF video/audio transmitter 10.

The VGA monitor 2 electronically communicates by wire to the VGA-NTSC encoder 9.

The keyboard 3 electronically communicates by wire to the keyboard, pointer, joystick switch device 8.

The mouse 4 electronically communicates by wire to the keyboard, pointer, joystick switch device 8.

The optional joystick 52 electronically communicates by wire to the keyboard, pointer, joystick switch device 8.

Furthermore, inside the computer module 5, the keyboard, pointer, joystick switch device 8 communicates electronically by wire with the RF remote keyboard receiver 7, the RF remote joystick receiver 30 and the RF remote pointer receiver 6.

Also, the VGA-NTSC encoder 9 electronically communicates by wire with the RF video and audio transmitter 10. The VGA-NTSC encoder 9 may be manufactured on one integrated circuit, or on one circuit board, with the switch device 8. This would allow the encoder 9 and the switch device 8 to be one sub-assembly to be incorporated into the computer module 5.

The remote pointer 14 communicates wirelessly with the RF remote pointer receiver 6.

The remote keyboard 13 communicates wirelessly with the RF remote keyboard receiver 7.

The optional remote joystick 54 communicates wirelessly with the optional RF remote joystick receiver 30.

The RF video and audio receiver 15 wirelessly communicates with the RF video and audio transmitter 10. The TV 11 electronically communicates by wire to the RF video and audio receiver 15.

The Couch Link embodiment allows a person to use a personal computer 1 in a remote fashion while watching the computer generated display on the TV 11. The user controls the cursor of the computer with the remote pointer 14, which is a hand-held pointing device, and enters keyboard data with the remote keyboard 13. The control of the cursor and the entering of data by the keyboard 13 occurs wirelessly by radio frequencies, and does not require communication by wire to the computer. The computer display and sounds are generated and transmitted to the TV 11 for display. The pointer and keyboard commands are sent to the personal computer 1, through the computer module 5, which may be located in a room separate from the user and the TV 11. The user may be in the room with the TV 11.

The remote keyboard 13 and the remote pointer 14 are known in the consumer electronics industry and are similar to remote controls for televisions and VCRs. However, known models of the remote keyboard 13 and the remote pointer 14 currently on the market are barely adequate for the preferred embodiment, although serviceable. It is expected that future developments of these and other remote devices used in the present invention will be superior to the currently available devices. In particular, changes in power levels and frequencies used to transmit the wireless signals are anticipated.

In the Couch Link embodiment shown in FIG. 1, the system is controlled wirelessly by the user manipulating the remote pointer 14 and remote keyboard 13. The user's commands are transmitted by the pointer 14 and keyboard 13 to the computer module 5 and are, in turn, communicated to the PC 1. The PC 1 generates a screen display which is transmitted to the computer module 5 and displayed on the VGA monitor 2. The computer module 5 wirelessly transmits data to the remote module 12, causing the TV 11 to display a TV version of the computer generated screen display shown on the VGA monitor 2. The screen display on the TV 11 is then observed by the user.

Audio signals are generated by the PC 1, played by the speakers (not shown) connected to the PC 1, and transmitted through the computer module 5 to the remote module 12, and played on the TV 11.

In the Couch Link embodiment shown in FIG. 1, the user may also control the system by wired keyboard 3 and wired mouse 4 while watching VGA monitor 2.

FIG. 1 also shows spaces for plug-in modules in the computer module 5, and the remote module 12, that may not be used in this embodiment.

The Keyboard/Pointer Sharing Circuit

The keyboard/pointer sharing circuit 8 (also called herein the sharing circuit 8) which toggles control of the PC 1 between the computer module 5 and the remote module 12 will now be explained with reference to FIGS. 1 and 2A–2C. The sharing circuit 8 provides an interface between the PC 1 and the remote module 12 and the (local) computer module 5.

Figure 2A:
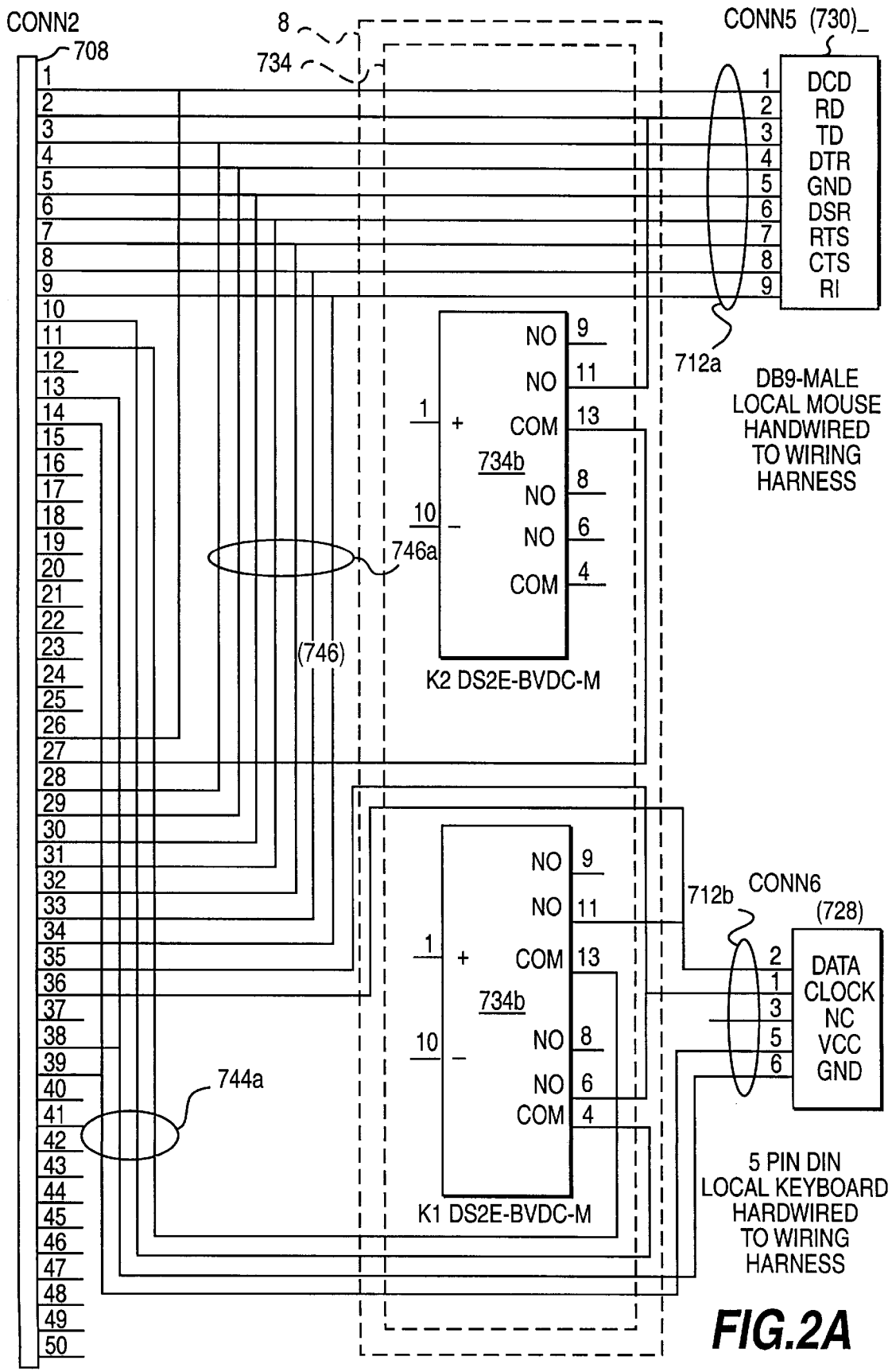

A connector 708 accepts data input from the peripheral controls of the remote module 12 and the computer module 5 to control the PC 1. The same connector 708 is illustrated in both FIGS. 2A and 2B. FIG. 2A illustrates the connections between local peripheral units, such as keyboard 3 and mouse 4, and PC 1 via sharing circuit 8 and connector 708. Peripheral inputs 728 and 730 operatively couple the local peripheral units to connector 708. In the illustrated embodiment, peripheral input 728 couples the local keyboard 3 to connector 708 and peripheral input 730 couples the local mouse 4 to connector 708. Although not illustrated, a similar connection can be provided to couple optional joystick 52 to the PC via a peripheral joystick input and connector 708.

Figure 2B:
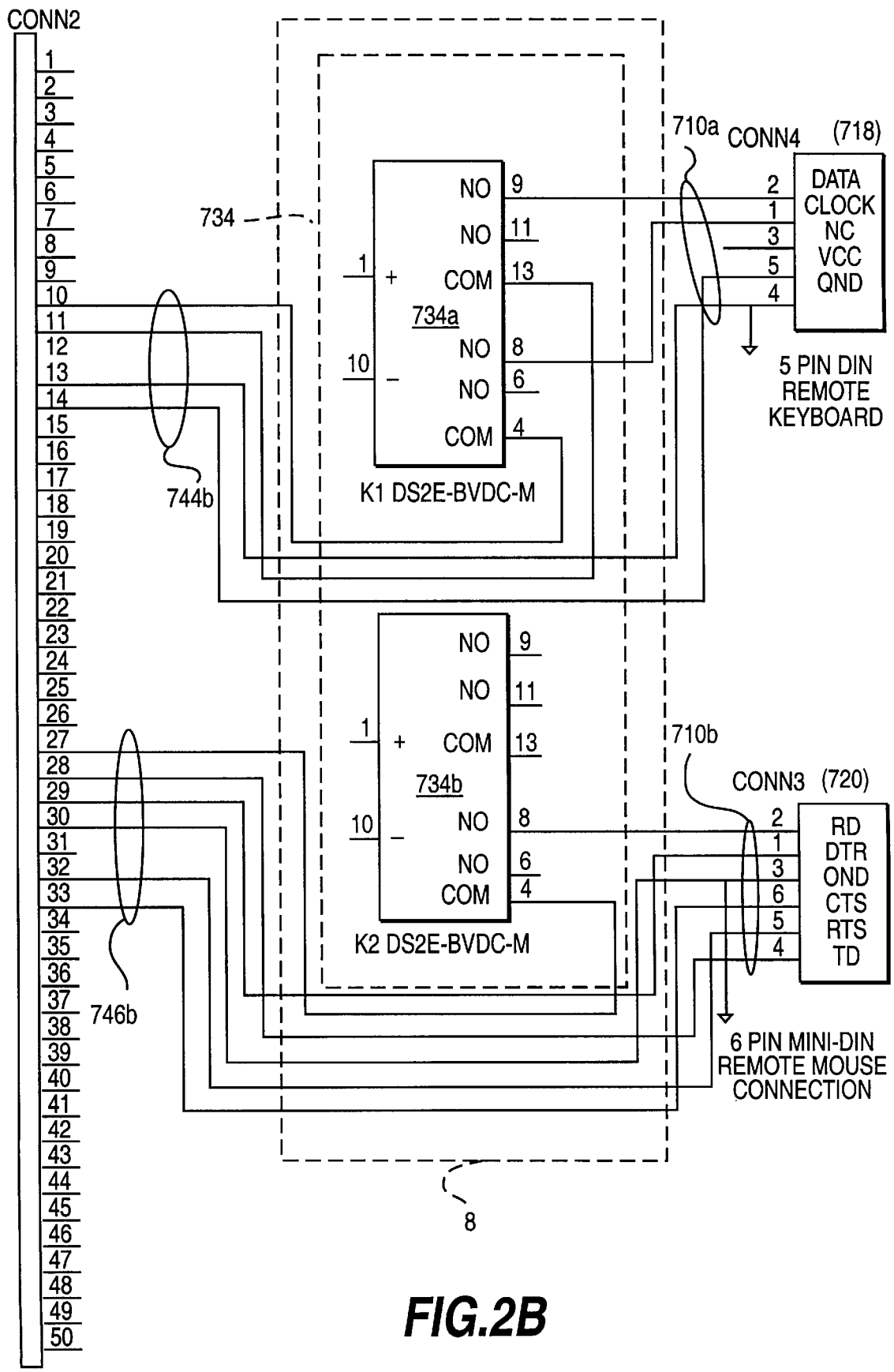

FIG. 2B illustrates the connections between remote peripheral units, such as keyboard 13 and mouse 14, and PC 1 also via sharing circuit 8 and connector 708. Peripheral inputs 718 and 720 operatively couple the remote peripheral units to connector 708. In the illustrated embodiment, peripheral input 718 couples the remote keyboard 13 to connector 708 and peripheral input 720 couples the remote mouse 14 to connector 708. A similar connection can be provided to couple optional joystick 54 to the PC via a peripheral joystick input and connector 708.

Connector 708 is coupled to the PC 1 via a mouse/pointer connector, a keyboard connector and/or a joystick connector located on PC 1. The mouse/pointer connector, keyboard connector and joystick connector are not illustrated in the figures. The connector 708 is a Centronics 50 pin PCB connector in the preferred embodiment. It is to be understood that any data connector may be used for the connector 708.

As shown in FIG. 2B, a set of remote input lines 710a and 710b connect the RF remote pointer receiver 6 and the RF remote keyboard receiver 7 via peripheral inputs 720 and 718, respectively, to the PC 1 so that the PC 1 can be controlled via the peripheral controls of the remote module 12. As shown in FIG. 2A, a set of local input lines 712a and 712b connect the local peripheral units, via peripheral inputs 728 and 730, to PC 1 to allow a user to control the PC 1 via the local peripheral units.

The remote module 12 controls the PC 1 through the remote peripheral inputs, including the keyboard input 718 and the pointer input 720. Each of the peripheral inputs 718 and 720 has a number of data lines and a power line. The power and data lines for each peripheral input is connected to the sharing circuit 8 via the remote input lines 710a, 710b. Similarly, computer module 5 has peripheral inputs associated therewith, including a keyboard input 728 and a mouse input 730. Each of the peripheral inputs 728 and 730 has a number of data lines and a power line. The power and data lines for each peripheral input is connected to the sharing circuit 8 via the local input lines 712a, 712b. The data and power lines for each peripheral input are connected to the connector 708 via the sharing circuit 8.

The sharing circuit 8 includes a switching circuit 734 and a micro controller 736. The same switching circuit 734 is illustrated in FIGS. 2A–2C. In the preferred embodiment, switching circuit 734 is composed of a number of single pole double throw relays 734a and 734b. Any appropriate analog switch, such as a Maxim 333 IC, may be used for the switching circuit 734. The micro controller 736 in the preferred embodiment is a PIC16c54 manufactured by Microchip, but it is to be understood that any suitable micro controller or microprocessor may be used.

Switching circuit 734 is attached to the data lines of the remote peripheral inputs 718 and 720 via input lines 710a, 710b (FIG. 2B). Similarly, switching circuit 734 is also attached to data lines of local peripheral inputs 728 and 730 via input lines 712a, 712b (FIG. 2A). Switching circuit 734 acts as a series of single-pole double-throw switches which provide data line access of the local and remote peripheral units to the PC 1 itself through data lines 744a, 744b and 746a, 746b, which connect the input lines 710a, 710b and 712a, 712b to the connector 708. The sharing circuit 8 turns on or off the remote keyboard and the remote pointer through a control line 740 by effectively disabling remote peripheral inputs 718 and 720. Although not illustrated, a similar configuration can be used to enable/disable the operation of local and remote joysticks 52 and 54.

The micro controller 736 has three momentary switch inputs 752, 754, and 756 which are housed locally. Momentary switch 752 toggles between local or remote control of the PC 1. Data lines 760 attached to the micro controller 736 also monitor the remote keyboard though remote peripheral input 718. Upon detection of a particular signal represented by ASCII code appearing on the input lines 710a, 710b from the keyboard input, the micro controller 736 gives control of the PC 1 to the remote peripheral inputs 718 and 720. Momentary switch 756 toggles power on and off to the PC 1. Momentary switch 754 provides signals to micro controller 736 for controlling actions thereof, such as activation of one or both of the joysticks.

In the preferred embodiment, an operator may use the remote set of input peripherals to take command of the PC 1, for example, by holding a pointer button, joystick button or keyboard key on for several seconds. An operator may use the computer module 5 to cause the local input peripherals to take command of the PC 1 by use of a momentary switch located on the computer module 5. When the microcontroller 736 senses which location has turned the computer on, the control of the computer is granted to the selected set of peripherals.

A light emitting diode (LED) 764 provides a visual indication when the peripherals of the remote module 12 have control of the PC 1. A light emitting diode (LED) 766 provides a visual indication when the peripherals of the computer module 5 have control of the PC 1. Of course, other indicators may be substituted for the LEDs 764 and 766.

Several modes of operating the PC are accessible by the user of the PC 1. A share mode, which can be entered by actuating a momentary switch, allows access to the PC 1 to the set of peripherals which are being used in real time. The micro controller 736 monitors each set of peripherals for activity and provides access to the active set of peripherals. In cases where both the remote and local set of peripherals attempt to use the peripheral, the local set of peripherals will have priority. A second operating mode is the remote mode, which can also be activated by actuating a momentary switch. This operating mode gives access to only the remote set of peripherals.

The Relink Embodiment

Figure 4:
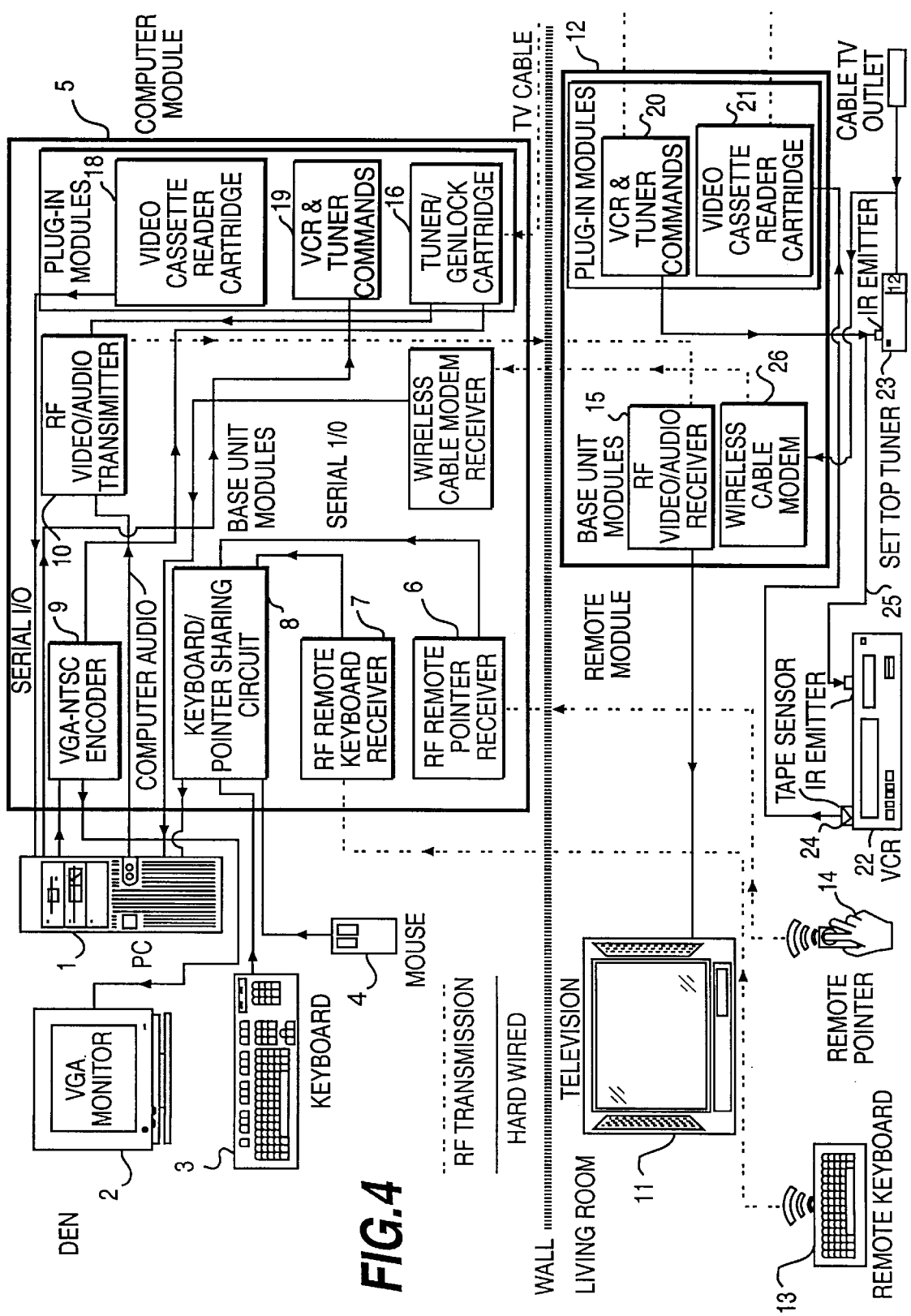
FIG. 4 is a schematic drawing of the configuration of the components of a total tuner cartridge Relink embodiment of the present invention, which includes additional add-on cartridges or modules.

FIGS. 3 and 4 are schematic representations of the components of the Relink embodiment and their communication and interaction with each other. The Relink embodiment provides additional functions that may be made available through an upgrade or add-on cartridge or module. More specifically, the Relink embodiment is a combination of the Couch Link hardware included in the basic Couch Link embodiment, certain plug-in or add-on modules or cartridges, and computer software programs. The computer software programs allow users to make choices that include the control of other consumer electronics hardware, such as, for example, a VCR, a CD player, or a cable TV set-top box tuner.

The Relink VCR and tuner command cartridge 19 (shown in FIG. 4 herein) allows the PC 1 to send signals to various consumer electronics hardware by way of a serial I/O connection from the PC 1 to a RF transmitter (not shown) in the computer module 5. This RF signal is transmitted by the RF transmitter to the remote module 12 and then converted to an infrared signal and sent to an infrared emitter 25 placed on the infrared sensor of the consumer electronics hardware. Other Relink VCR and tuner command cartridge computer software programs provide control of TV tuning by individual station, by time of day, and by day of week.

The Relink video cassette reader cartridge allows the PC 1 to read the software in the various consumer electronics hardware. This video cassette reader cartridge comes with a sensor and unique identification stickers. This sensor is attached to a location on the consumer electronics hardware so that is comes in close contact with the consumer electronics hardware as the user puts consumer electronics software into that machine. The sensor may be attached adjacent to a VCR video cassette door, for example. The user places stickers on the consumer electronics software, such as a video cassette, for example. As the user places a stickered videocassette into the VCR, the sensor reads the identification sticker. This information is sent to the remote module 12 and wirelessly transmitted to the computer module 5 and then into the computer 1. The computer software program includes a data base that keeps track of the contents stored on each piece of consumer electronics software such as a video cassette. Similar labels and sensors can be used for CDs and CD readers for the present invention.

The Relink tuner/genlock cartridge 16 shown in both FIG. 3 and FIG. 4 allows more advanced control of TV tuning. The Relink tuner/genlock cartridge 16 requires cable TV service and/or a TV antenna lead to be fed to the computer module 5. The Relink tuner/genlock cartridge 16 has a TV tuner or cable TV set-top box within it. Unlike the Relink VCR and tuner command cartridge 19, which simply sends commands to a tuner, the Relink tuner/genlock cartridge 16 fully controls tuning of the TV, so that the computer software can monitor the activity of the tuner. The Relink tuner/genlock cartridge 16 also enables the use of computer software programs that can mix and/or overlay computer generated text/images onto the video display from the cable TV and/or antenna connection. This allows for numerous interactive TV applications including, for example, pay-per-view, impulse product purchases, and TV game show participation. In addition, it allows the computer 1 to read data embedded in the vertical blanking interval of the TV signal. This data path is used by Intercast Technology (for example) and permits the computer 1 to receive broadcast Web pages and other data combined with associated cable or broadcast TV programming.

Other cartridges include a Relink cartridge which functions like another computer. This Relink cartridge is comprised of a mother board, RAM and expansion slots. This cartridge is located in either the remote module 12 or computer module 5 and is networked to the original PC 1, enabling the cartridge to share the hard drive of the PC 1. When located locally, these two computers are located next to each other and make a "flat" network. This cartridge is useful in situations where there is a lot of local demand for the PC 1. The cartridge would share the hard drive and other hardware of the PC 1, while performing the CPU functions of the PC 1 in the configuration shown in FIG. 1.

The Relink VCR and tuner command cartridge includes two plug-in modules 19 and 20. Module 20 is provided in the remote module 12 and module 19 is provided in the computer module 5. Using software, the PC 1 communicates by wire to the VCR and tuner command plug-in module 19 in the computer module 5. This plug-in module 19 then communicates wirelessly with its partner VCR and tuner command plug-in module 20 in the remote module 12, which then communicates by wire to IR emitters 25 to transmit signals to the VCR 22 and/or the set top tuner 23.

Where plug-in modules and cartridges are shown and discussed here, the present invention may alternatively use alternative versions of the computer module 5 and remote module 12 without plug-in cartridges or modules, but instead with the components of the various plug-in cartridges 16, 18, 19, 20, and 21 permanently incorporated into their respective modules 5 and 12 at the time of original manufacture. Then, for example, if the user wanted to upgrade his functions from the system shown in FIG. 1, to the system shown in FIG. 3, he would not buy plug-in cartridge 16, but instead buy an new computer module 5 with the tuner/genlock permanently installed at the original manufacture.

The Relink video cassette reader cartridge includes two plug in modules 18 and 21. Module 21 is provided in the remote module 12 and module 18 is provided in the computer module 5. The VCR 22 communicates, via a tape sensor 24, with the video cassette reader plug-in module 21. Communication is provided by scanning, in close proximity, using a magnetic strip or bar code laser and then, by wire, to the video cassette reader plug-in module 21 in the remote module 12. This plug-in module 21 then communicates wirelessly with its associated video cassette reader plug-in module 18 in the computer module 5. The video cassette reader plug-in module 18 then communicates by wire to the PC 1 where the data are processed by software.

The Relink tuner/genlock cartridge 16 includes one plug in module. Using software, the PC 1 communicates by wire to the tuner/genlock cartridge 16 in the computer module 5. This communication is in the form of channel commands and computer display signals (for example, VGA on the PC platform). The Relink tuner/genlock cartridge 16 is directly wired to a cable TV service and/or a TV antenna lead which provides reception of TV channel broadcasts. The selected TV channel is mixed with the computer display and then communicated by wire to the RF video and audio transmitter 10. The signal then follows the established Couch Link path to the remote module 12.

The Relink VCR and tuner command cartridge 19 allows the PC 1 to control the television 11 and/or the set top tuner 23 programming by scheduling and selecting programs for viewing. Programs selected may include any of the traditional or non-traditional feeds (such as unscheduled feeds during very late night time slots or on normally dark cable channels) to the television 11, including ground television broadcasts, cable, direct from satellite broadcasts, or wireless cable.

The Relink wireless cable modem cartridges 26,27 allow the PC 1 to receive digital information from the cable TV connection near the television 11. Cable modems are much faster than telephone modems, and therefore, when they become more common, many computer users will prefer to use them. However, without the Relink wireless cable modem cartridges 26, 27, a separate cable outlet would be needed near the PC 1. Such a new cable TV outlet would likely be installed by the cable TV operator for a fee. However, the Relink wireless cable modem cartridge 26 receives digital information from the existing cable outlet near the television 11 and sends it wirelessly to the wireless cable modem receiver 27 near the PC 1, without the need for a new cable outlet.

The Couch Link system, shown in FIG. 1, does not permit separate control of television programming with the PC 1. The system instead merely uses the television 11 as an alternate visual output device for the computer-generated displays. The Couch Link system permits a more relaxed and user-friendly control and use of a PC. For example, a user may recline on a couch in the den, watching the computer-generated displays on a large color television 11 in the den, and using any of the control devices 3, 4, 13 and 14 with no inconvenient wire connections to a PC 1 located in the den or in another room or closet.

The Relink cartridges allow the same functions as the Couch Link and, in addition, allow a variety of computer software to also control what would otherwise be conventional television programming. For example, the PC could filter out objectionable programming, automatically switch channels, automatically project selected pre-scheduled television or cable programming on the television, control a collateral VCR, mute the audio during commercials, and otherwise.

The sharing circuit 8 may be sold separately to other manufacturers by the inventor or licensees of the present invention.

Power Circuit

The present invention in one embodiment may further include a power circuit. To turn on the Couch Link or Relink system and the PC 1, when using a power circuit, the user presses a button on a user's hand-held remote control. Couch Link's and Relink's computer module 5 supplies continuous power to the RF remote receiver 6. Couch Link's and Relink's computer module 5 monitors the RF remote receiver 6 for a signal. As soon as Couch Link's or Relink's computer module 5 senses this signal, Couch Link or Relink, as the case may be, turns the system on, in addition to providing power to a standard IEEE power socket on the module. The power cable of the PC 1 is plugged into the socket, and the PC is thereby turned on when power is provided to the socket. In addition, when the PC is turned on by Couch Link or Relink, the PC runs a batch file which initiates a Windows, Macintosh, or any other operating system desktop environment formatted for optimum use on the screen of the TV 11, namely, with large fonts and widely spread icons.

The power circuit may be sold separately to other manufacturers. This circuit controls the control devices 3, 4, 13 and 14. When the user turns on the Couch Link system, exclusive control is provided to the location from which the system is turned on. If the user turns Couch Link on from the remote location, then the remote keyboard, pointer and joystick have control and the local keyboard, pointer and joystick are inoperable. This protects the user from having someone else compete for control. The inverse is also true. If the user turns Couch Link on from the local location (that is, from a button on Couch Link's computer module 5), then the local keyboard, pointer and joystick have control and the remote keyboard, pointer and joystick are inoperable.

The local location includes two additional features. When Couch Link is turned on locally, it will not send the computer display to the TV 11, which provides privacy to the local user. People watching TV 11 cannot see what the local user is doing on the PC 1. The Couch Link system has an override for this function called "video share" which allows the local user to send the video display to the TV 11. The second feature available at the local location is "remote control". Operating a button providing remote control switches the operative keyboard, pointer and joystick to the remote location. This feature is valuable for local users wanting to switch locations without turning off the Couch Link system (only to have to turn it on again from the remote location) and for local users wanting to interact with remote users.

To turn off the Couch Link or Relink system and the PC 1, the user clicks on an icon on the display generated by the PC 1 and projected on the VGA monitor 2 and the TV 11. This instructs the PC 1 to send a power-off signal to Couch Link's or Relink's computer module 5. When the computer module 5 receives this power-off signal, all power is turned off, except power to the continuously monitored RF remote receiver 6.

The present invention may also be practiced with conventional manual power switches.

Components

In the preferred embodiments of Couch Link and Relink as presently understood by the inventor, the wireless remote pointer 14 is manufactured by Logitech and referred to as the Trackman. The wireless remote keyboard 13 is manufactured by Sejin and referred to as the Wireless Keyboard. (This product may be modified to increase its transmission power levels for superior performance in the present invention.) The VGA-NTSC encoder is manufactured by AI Tech. The video transmitter/receiver, defined by the transmitter 10 and the receiver 15, is manufactured by RF Link and referred to as the Wavecom Jr. The remaining individual elements of the Couch Link and Relink systems not specifically mentioned are also commercially available and easily recognized by those skilled in the art.

The individual components indicated in Couch Link and Relink now may be purchased off the shelf from various suppliers, with the exception of the Couch Link and Relink power circuit (if a power circuit is used instead of manual switches), and keyboard, pointer, joystick switch device or sharing circuit 8. A Couch Link/Relink power circuit and a keyboard, pointer, joystick switch device 8 (as described herein) are each available from the inventor of the present invention.

The individual components of the present invention can be bought as separate units and connected together as indicated to make the Couch Link and Relink devices. The indicated components may also be embodied by custom manufactured circuit boards or circuit elements, and assembled inside a single box or device in the case of the computer module 5 and the remote modules 12. This latter approach to manufacturing the present invention leads, in larger quantities, to a cheaper unit price, but requires some custom manufacture.

Other Comments

For ease of exposition, PCs are often referred to herein. However, the present invention may use any applicable PC, computer, computer chip, ASIC, integrated circuit, or other programmable device, for this component.

The preferred embodiments currently use RF signals sent through the atmosphere for the wireless communication links. Each RF transmitter is tuned to the same RF frequencies as the respective RF receiver with which it communicates. However, the present invention may use for wireless communication links, instead of RF transmission through the atmosphere, any of the following: infrared transmission, or RF transmission through the existing electric power or telephone wiring of the building in which the invention is located, RF repeaters, infrared to RF converters, RF to infrared converters, or any other wireless telecommunication technology.

The embodiments illustrated and discussed in this specification are intended only to teach to those skilled in the art the best way known by the inventor to make and use the invention. Nothing in the specification should be considered as limiting the scope of the present invention. Changes can be made by those skilled in the art to produce equivalent systems without departing from the invention. The present invention should only be limited by the following claims and their legal equivalents.

Other embodiments of the present invention and of Couch Link and Relink embodiments not shown in FIGS. 1–4 may allow the various components to be in various rooms with various configurations of connections by remote links and wired links among the components in the same or different rooms.

Embodiments of the present invention could operate without, variously, keyboards 3 and/or 13, mice 4 and/or 14, and wired and/or wireless joysticks.

The base unit Couch Link embodiment could be practiced without any plug-in modules and without any spaces for plug-in modules.

The present invention may also be practiced without the power circuit, using conventional manual power switches.

I claim:

1. A system for linking a locally located computer having a local user interface and a remotely located television remotely located from the computer, comprising:

a remote user interface device including an RF transmitter transmitting an RF remote user interface signal from a location remote to the computer;

a remote module remotely located from the computer and locally located to the television, said remote module being connected to the television;

a controller controlling said local/remote user interface sharing circuit to toggle inputs from either said RF remote user interface receiving device or said local user interface device to the computer in response to an input from said remote user interface device or said local user interface device;

said controller controlling said local/remote user interface sharing circuit to permit said local user interface device or said RF remote user interface device to control the computer, said remote module including an RF audio/display signal receiving device receiving the RF second format audio/display signal from said RF video/audio transmitter and sending a second format video/audio signal to the television via a hardwired connection.

2. The system according to claim 1, wherein the first format is a VGA format.

3. The system according to claim 1, wherein the second format is an NTSC format.

4. The system according to claim 1, further comprising:
a remote pointing device including an RF transmitter transmitting an RF remote pointing signal.

5. The system according to claim 1, further comprising:
a remote game controlling device including an RF transmitter transmitting an RF remote game controlling signal.

6. The system according to claim 1, further comprising:
a plurality of remote user interfaces each of which transmits an RF user interface signal:
said local/remote user interface sharing circuit having input connections with each of said remote user interfaces.

7. The system according to claim 1, further comprising:
a sharing mode wherein both said local and said remote user interface devices share control of the computer via said local/remote user interface sharing circuit.

8. The system according to claim 1, further comprising:
a privacy mode wherein said controller permits only said local user interface device to control the computer and said RF video/audio transmitter does not transmit the RF audio display second format signal to the television.

9. The system according to claim 1, wherein said remote user interface device utilizes existing alternating current wires, telephone wires or coaxial cables to transmit the remote user interface signal.

10. The apparatus according to claim 1, said computer module including a privacy mode triggered with either said local user interface device or said remote user interface device and which causes said computer module not to send the audio/display signal to the remote module or not to send the audio/display signal to a local monitor, respectively.

11. A system for permitting variable control of a locally located computer, comprising:
a local user interface device locally located to the computer;
a remote user interface device including an RF transmitter transmitting an RF remote user interface signal from a location remote to the computer;
an RF remote user interface receiving device receiving the RF remote user interface signal from said remote user interface device, said RF remote user interface receiving device locally located to the computer;
a local/remote user interface sharing circuit having inputs connected to said RF remote user interface receiving device and said local user interface device and having an output connected to the computer;
said local/remote user interface sharing circuit toggling inputs to and thereby provide control over the computer between a local user via said local user interface device and a remote user via said remote user interface device, and
a controller controlling said local/remote user interface sharing circuit to toggle inputs from said RF remote user interface receiving device or said local user interface device and supply the toggled input to the computer in response to an input from said remote user interface device or said local user interface device,
said controller controlling said local/remote user interface sharing circuit to permit said local user interface device or said RF remote user interface device to control the computer.

12. The system according to claim 11, further comprising:
a remote pointing device including an RF transmitter transmitting an RF remote pointing signal.

13. The system according to claim 11, further comprising:
a remote game controlling device including an RF transmitter transmitting an RF remote game controlling signal.

14. The system according to claim 11, further comprising:
a plurality of remote user interfaces each of which transmits an RF user interface signal:
said local/remote user interface sharing circuit having input connections with each of said remote user interfaces.

15. The system according to claim 11, further comprising:
a sharing mode wherein both said local and said remote user interface devices share control of the computer via said local/remote user interface sharing circuit.

16. The system according to claim 11, further comprising:
a privacy mode wherein said controller permits only said local user interface device or said remote user interface device to control the computer.

17. The system according to claim 11, wherein said remote user interface device utilizes existing alternating current wires, telephone wires or coaxial cable to transmit the remote user interface signal.

* * * * *

UNITED STATES PATENT AND TRADEMARK OFFICE
CERTIFICATE OF CORRECTION

PATENT NO. : 5,850,340
DATED : December 15, 1998
INVENTOR(S) : Matthew York

It is certified that error appears in the above-identified patent and that said Letters Patent is hereby corrected as shown below:

Claim 1, after line 9, insert
-- a computer module locally located to the computer and connected to the computer, said computer module including
a local user interface device sending a local user interface signal to the computer; and
an RF remote user interface receiving device receiving the RF remote user interface signal from said remote user interface device,
a format conversion device converting an audio/display signal received from the computer in a first format compatible with a computer display into a second format compatible with the television,
an RF video/audio transmitter receiving the audio/display second format signal from said

UNITED STATES PATENT AND TRADEMARK OFFICE
CERTIFICATE OF CORRECTION

PATENT NO. : 5,850,340
DATED : December 15, 1998
INVENTOR(S) : Matthew York

It is certified that error appears in the above-identified patent and that said Letters Patent is hereby corrected as shown below:

format conversion device and transmitting an RF audio/display second format signal,
a local/remote user interface sharing circuit having inputs connected to said RF remote user interface receiving device and said local user interface and having an output connected to the computer,
said local/remote user interface sharing circuit toggling inputs to and thereby providing control over the computer between a local user via said local user interface device and a remote user via said remote user interface device, and - -

Signed and Sealed this

Fifteenth Day of June, 1999

Attest:

Q. TODD DICKINSON

Attesting Officer

Acting Commissioner of Patents and Trademarks